US011394621B2

(12) United States Patent
Tootaghaj et al.

(10) Patent No.: US 11,394,621 B2
(45) Date of Patent: *Jul. 19, 2022

(54) PROACTIVELY ACCOMODATING PREDICTED FUTURE SERVERLESS WORKLOADS USING A MACHINE LEARNING PREDICTION MODEL

(71) Applicant: Hewlett Packard Enterprise Development LP, Houston, TX (US)

(72) Inventors: Diman Zad Tootaghaj, Palo Alto, CA (US); Junguk Cho, San Jose, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 8 days.

This patent is subject to a terminal disclaimer.

(21) Appl. No.: 16/931,850

(22) Filed: Jul. 17, 2020

(65) Prior Publication Data

US 2021/0184942 A1    Jun. 17, 2021

Related U.S. Application Data

(63) Continuation of application No. 16/714,637, filed on Dec. 13, 2019.

(51) Int. Cl.
*H04L 41/16* (2022.01)
*H04L 41/5009* (2022.01)
(Continued)

(52) U.S. Cl.
CPC .............. *H04L 41/16* (2013.01); *G05B 6/02* (2013.01); *G06N 20/10* (2019.01); *H04L 41/147* (2013.01);
(Continued)

(58) Field of Classification Search
CPC ... H04L 41/16; H04L 41/147; H04L 41/5009; H04L 41/5054; H04L 41/5025; G05B 6/02; G06N 20/10
See application file for complete search history.

(56) References Cited

U.S. PATENT DOCUMENTS

| 2006/0013132 | A1 | 1/2006 | Garnett et al. |
| 2020/0336566 | A1 | 10/2020 | Yassin et al. |
| 2020/0389516 | A1* | 12/2020 | Parekh ................ G06F 9/44505 |

FOREIGN PATENT DOCUMENTS

WO    WO-2020244730 A1 *  12/2020  ........... H04L 41/147

OTHER PUBLICATIONS

A. Ellis. Introducing functions as a service. https://blog.alexellis.io/introducing-functions-as-a-service.
(Continued)

*Primary Examiner* — Joe Chacko
(74) *Attorney, Agent, or Firm* — Hewlett Packard Enterprise Patent Department

(57) ABSTRACT

Example implementations relate to a proactive auto-scaling approach. According to an example, a machine-learning prediction model is trained to forecast future serverless workloads during a window of time for an application running in a public cloud based on past serverless workload information associated with the application by performing a training process. During the window of time, serverless workload information associated with the application is monitored. A future serverless workload is predicted for the application at a future time within the window, based on the machine learning prediction model. Prior to the future time, containers within the public cloud executing the application are pre-warmed to accommodate the predicted future serverless workload by issuing fake requests to the application to trigger auto-scaling functionality implemented by the public cloud.

18 Claims, 10 Drawing Sheets

(51) Int. Cl.
  *H04L 41/5054* (2022.01)
  *G06N 20/10* (2019.01)
  *H04L 41/147* (2022.01)
  *G05B 6/02* (2006.01)

(52) U.S. Cl.
  CPC ...... *H04L 41/5009* (2013.01); *H04L 41/5054* (2013.01)

(56) References Cited

OTHER PUBLICATIONS

Amazon. AWS Lambda—Serverless Compute. https://azure.microsoft.com/en-us/services/functions/.
Azure Functions Serverless Architecture Microsoft Azure. https://aws.amazon.com/lambda/.
Cloud Functions—Serverless Environment to Build and Connect Cloud Services Google Cloud Platform. https://cloud.google.com/functions/.
IBM OpenWhisk. https://github.com/openwhisk/openwhisk/.
Kubernetes Fission. Serverless Functions as a Service for Kubernetes developed by Platform9. http://fission.i.
S. Hendrickson, et al. Serverless computation with openlambda In HotCloud, 2016.
The Knative Serving Authors. Knative Serving, https://github.com/knative/serving.
I. Baldini, P. Castro, K. Chang, P. Cheng, S. Fink, V. Ishakian, N. Mitchell, V. Muthusamy, R. Rabbah, A. Slominski, et al. Serverless computing: Current trends and open problems. In Research Advances in Cloud Computing, pp. 1-20. Springer, 2017.
The Kubernetes Authors.Horizontal pod autoscaler—kuber-netes. https://kubernetes.io/docs/tasks/run-application/horizontal-pod-autoscale/. [Online; accessed 2019].
How does language, memory and package size affect cold starts of AWS Lambda? https://read.acloud.guru/does-coding-language-memory-or-package-size-affect-cold-starts-of-aws-lambda-a15e26d12c76. [Online; accessed 2017].
L. Wang, M. Li, Y. Zhang, T. Ristenpart, and M. Swift. Peeking behind the curtains of serverless platforms. In USENIX Annual Technical Conference (ATC), 2018.
Istemi Ekin Akkus, Ruichuan Chen, Ivica Rimae, Manuel Stein, Klaus Satzke, Andre Beck, Paarijaat Aditya, and Volker Hilt. Sand: Towards high-performance serverless computing. In 2018 USENIX Annual Technical Conference, pp. 923-935, 2018.
W. Lloyd, S. Ramesh, S. Chinthalapati, L. Ly, and S. Pallickara. Serverless computing: An investigation of factors influencing microservice performance. In International Conference on Cloud Engineering (IC2E). IEEE, 2018.
Hey, HTTP(S) load generator, ApacheBench (ab) replacement, written in Go. https://github.com/rakyll/hey. [Online; accessed 2019].
The Knative Serving Authors. Knative Serving Autoscal-ing. https://github.com/knative/docs/tree/master/docs/serving/samples/autoscale-go. [Online; accessed 2019].
The Istio Authors. Istio, connect, secure, control, and observe services, https://istio.io/. [Online; accessed 2019].
Anna Bouch, Allan Kuchinsky, and Nina Bhatti. Quality is in the eye of the beholder: meeting users' requirements for internet quality of service. In Proceedings of the SIGCHI conference on Human Factors in Computing Systems, pp. 297-304. ACM, 2000.
Amazon found every 100ms of latency cost them 1% in sales, https://www.gigaspaces.com/blog/amazon-found-every-100ms-of-latency-cost-them-1-in-sales/. [Online; accessed 2019].
S. A. Ajila and A. A. Bankole. Cloud client prediction models using machine learning techniques. In 37th Annual Computer Software and Applications Conference. IEEE, 2013.
S. Kundu, R. Rangaswami, A. Gulati, M. Zhao, and K. Dutta. Mod-eling virtualized applications using machine learning techniques. In ACM Sigplan Notices, 2012.
D. Hilley. Cloud computing: A taxonomy of platform and infrastructure-level offerings. Technical report, Georgia Institute of Technology, 2009.
X. Ma, Z. Tao, Y. Wang, H. Yu, and Y. Wang. Long short-term memory neural network for traffic speed prediction using remote microwave sensor data. Transportation Research Part C: Emerging Technologies, 2015.
L. Baresi, S. Guinea, A. Leva, and G. Quattrocchi. A discrete-time feedback controller for containerized cloud applications. In 24th ACM SIGSOFT International Symposium on Foundations of Software Engineering. ACM, 2016.
[Z. Wang, X. Zhu, and S. Singhal. Utilization and slo-based control for dynamic sizing of resource partitions. In International Workshop on Distributed Systems: Operations and Management. Springer, 2005.
X. Liu, X. Zhu, S. Singhal, and M. Arlitt. Adaptive entitlement control of resource containers on shared servers. In 9th IFIP/IEEE, International Symposium on Integrated Network Management (IM), 2005.
H. C. Lim, S. Babu, J. S. Chase, and S. S. Parekh. Automated control in cloud computing: challenges and opportunities. In Proceedings of the 1st workshop on Automated control for datacenters and clouds. ACM, 2009.
H. C. Lim, S. Babu, and J. S. Chase. Automated control for elastic storage. In Proceedings of the 7th international conference on Autonomic computing. ACM, 2010.
[P. Padala, K. Y. Hou, K. G. Shin, X. Zhu, M. Uysal, Z. Wang, S. Singhal, and A. Merchant. Automated control of multiple virtualized resources. In Proceedings of the 4th ACM European conference on Computer systems. ACM, 2009.
J. G. Ziegler and N. B. Nichols. Optimum settings for automatic controllers. trans. ASME, 1942.
Y. Cui. Im afraid youre thinking about AWS Lambda cold starts all wrong, https://hackernoon.com/im-afraid-you-re-thinking-about-aws-lambda-cold-starts-all-wrong-7d907f278a4f [Online; accessed 2019].
NYC taxi and limousine commission. https://www1.nyc.gov/site/tlc/about/tlc-trip-record-data.page. [Online; accessed 2018].
A. . Bhattacharjee, A. D. Chhokra, Z. Kang, H. Sun, A. Gokhale, and G. Karsai. Barista: Efficient and scalable serverless serving system for deep learning prediction services. arXiv preprint arXiv:1904.01576, 2019.
S. Fouladi, R. S. Wahby, B. Shacklett, K. V. Balasubramaniam, W. Zeng, R. Bhalerao, A. Sivaraman, G. Porter, and K. Winstein. En-coding, fast and slow: Low-latency video processing using thousands of tiny threads. In 14th USENIX Symposium on Networked Systems Design and Implementation, 2017.
S. Hong, A. Srivastava, W. Shambrook, and T. Dumitra. Go serverless: securing cloud via serverless design patterns. In 10th USENIX Workshop on Hot Topics in Cloud Computing (HotCloud 18), 2018.
Q. Pu, S. Venkataraman, and I. Stoica. Shuffling, fast and slow: scalable analytics on serverless infrastructure. In 16th USENIX Symposium on Networked Systems Design and Implementation, 2019.
E. Jonas, Q. Pu, S. Venkataraman, I. Stoica, and B. Recht. Occupy the cloud: Distributed computing for the 99%. In Proceedings of the 2017 Symposium on Cloud Computing. ACM, 2017.
G. McGrath and P. R. Brenner. Serverless computing: Design, implementation, and performance. In 37th International Conference on Distributed Computing Systems Workshops (ICDCSW). IEEE, 2017.
M. Malawski, A. Gajek, A. Zima, B. Balis, and K. Figiela. Serverless execution of scientific workflows: experiments with hyperflow, aws lambda and google cloud functions. Future Generation Computer Systems, 2017.
T. Lorido-Botran, J. Miguel-Alonso, and J. A. Lozano. A review of auto-scaling techniques for elastic applications in cloud environments. Journal of grid computing, 2014.
E. Casalicchio and L. Silvestri. Autonomic management of cloud-based systems: the service provider perspective. In Computer and Information Sciences III. Springer, 2013.

(56) References Cited

OTHER PUBLICATIONS

X. Dutreilh, A. Moreau, J. Malenfant, N. Rivierre, and I. Truck. From data center resource allocation to control theory and back. In international conference on cloud computing. IEEE, 2010.

R. Han, L. Guo, M. M. Ghanem, and Y. Guo. Lightweight resource scaling for cloud applications. In 12th IEEE/ACM International Symposium on Cluster, Cloud and Grid Computing (ccgrid 2012). IEEE Computer Society, 2012.

Ping-Min Lin and Alex Glikson. Mitigating cold starts in serverless platforms: A pool-based approach. arXiv preprint arXiv:1903.12221, 2019.

J. Barr. Firecracker Lightweight Virtualization for Serverless Computing. https://aws.amazon.com/blogs/aws/firecracker-lightweight-virtualization-for-serverless-computing/. [Online; accessed 2019].

E. Oakes, L. Yang, D. Zhou, K. Houck, T. Harter, A. Arpaci-Dusseau, and R. Arpaci-Dusseau. Sock: Rapid task provisioning with serverless-optimized containers. In 2018 USENIX Annual Technical Conference, pp. 57-70, 2018.

S. Boucher, A. Kalia, D. G. Andersen, and M. Kaminsky. Putting the "micro" back in microservice. In 2018 USENIX Annual Technical Conference, 2018.

R. G. Rakshasmare, G. A. Kamble, R. H. Chile. "Some Tuning Methods of PID Controller for Different Processes." International Conference on Information Engineering, Management and Security 2015): 282-288. Print.

\* cited by examiner

PROACTIVELY ACCOMODATING PREDICTED FUTURE SERVERLESS WORKLOADS USING A MACHINE LEARNING PREDICTION MODEL

CROSS-REFERENCE TO RELATED PATENTS

This application is a continuation of U.S. patent application Ser. No. 16/714,637, filed on Dec. 13, 2019, which is hereby incorporated by reference in its entirety for all purposes.

BACKGROUND

Serverless computing (a/k/a Function as a Service (FaaS)) generally refers to a cloud computing execution model in which the cloud provider dynamically manages the allocation of machine resources, and bills the user/subscriber based on the actual amount of resources consumed by an application, rather than billing based on pre-purchased units of capacity. While the adoption of serverless computing is growing rapidly as a result of its simplified deployment and scalability of cloud services, the performance, elasticity, and cost efficiency of today's serverless computing platforms (a/k/a serverless frameworks) are hampered due to simplistic and predefined threshold-based container orchestration and start-up overhead.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1:
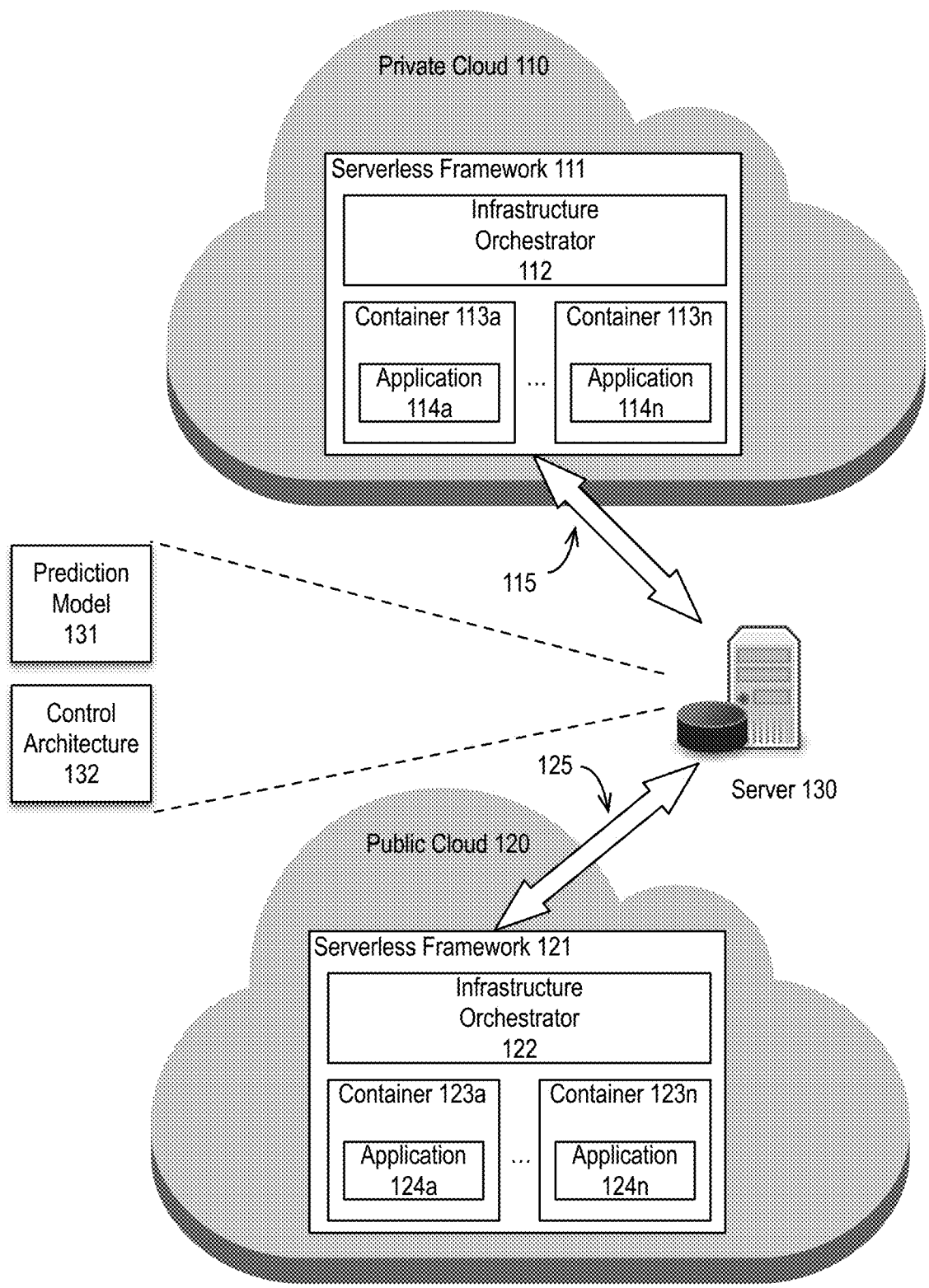
FIG. 1 is a block diagram conceptually depicting interactions among a server, a private cloud and a public cloud in accordance with an embodiment.

Embodiments described herein are generally directed to systems and methods for improving auto-scaling for serverless frameworks in private cloud and public cloud infrastructure. In the following description, numerous specific details are set forth in order to provide a thorough understanding of example embodiments. It will be apparent, however, to one skilled in the art that embodiments described herein may be practiced without some of these specific details. In other instances, well-known structures and devices are shown in block diagram form.

Serverless architectures offer several advantages compared to complex server-based architectures including reduced design complexity, simplified code, and deployment, ease of management and granular billing. In a serverless programming model, developers can launch thousands of light-weight tasks in the form of functions and submit these tasks to the cloud to run on a shared runtime environment. The elasticity feature in serverless computing allows users to acquire and release the resources according to their needs. However, to utilize the resources efficiently and provide the expected quality of service for each application, the right amount of resources should be provisioned and de-provisioned at the appropriate time.

It is known that allocating more resources improves an applications' running time. Thus, a naive approach to guarantee metrics (e.g., quality, availability, and query response time) of a service level agreement (SLA) is to overprovision the resources. However, doing so can impose unnecessary costs to the serverless provider. To accommodate the load, serverless providers automatically scale the configuration or the number of replicas up and down and therefore, developers do not need to worry about provisioning the resources to serve their workload. However, the non-negligible start-up latency of serverless computing platforms leads to significant performance degradation under interactive and bursty function workloads which call for fast scaling and low latency.

To address this issue, industrial and open-source serverless platforms, such as Kubernetes, OpenFaas, and Apache OpenWhisk, often try to adopt some sort of auto-scaling and warm up the replicas (e.g., the containers or pods) to optimize latency and throughput. But, current auto-scaling approaches are usually naive and can lead to wasted resources and low efficiency. The most common auto-scaling solution is to adopt a threshold-based approach that monitors the invocation rate (e.g., queries per second) and scales the resources when the invocation rate exceeds a pre-specified threshold. While such threshold-based auto-scaling approaches are simple to implement, they do not meet quality of service (QoS) requirements of applications as they lack QoS support. Additionally, identifying a suitable threshold for each application is very tricky and may cause instabilities in the serverless platform.

Furthermore, the reactive nature of existing auto-scaling approaches implemented by current serverless computing platforms is problematic. A reactive autoscaling approach scales in/out the resources based on the current or short historical situation of the workload. The main drawback of reactive approaches is that they neglect the replica (e.g., container or pod) start-up latency leading to under-provisioning of the resources which may consequently lead to SLA violation. Another drawback of reactive approaches is cold start latency. Cold start latency is the result of a function invocation after not being used for an extended period of time, causing an increased invocation latency. Most serverless platforms terminate a container, for example, when the function execution ends or after a specific time interval. For example, cold starts occur in Amazon Web Services (AWS) Lambda when the Lambda function is idle for longer than five minutes. Starting a new cold container for a function invocation incurs a long latency for each such request.

Embodiments described herein seek to address various of the above shortcomings by using a proactive approach that employs a prediction model to predict future workload ahead of time and adjusting the resources in advance to meet a target performance metric, for example. As will be appreciated by those skilled in the art, the embodiments described herein provide a serverless auto-scaling approach that improves response times and the efficiency of resource usage by leveraging workload prediction and the novel control-theoretic resource orchestration.

Depending upon the context (e.g., a private cloud vs. a public cloud) of the serverless framework at issue, embodiments described herein may have more or less control over the number of replicas due to administrative access or lack thereof to the infrastructure orchestrator of the serverless framework. In the context of a private cloud (a/k/a an internal or enterprise cloud), which resides on a company's intranet or hosted data center, for example, the proposed auto-scaling functionality described herein may have more direct control over the number of replicas. For example, users may be allowed to directly manage or implement the scaling policies. As such, private cloud embodiments may include a proactive control-theory based model that uses machine learning to predict the workload as an alternative to the existing naive threshold-based approaches. In the context of a public cloud, in which the proposed auto scaling functionality may have no direct control over the number of replicas, embodiments described herein use the machine learning workload prediction to trigger auto-scaling implemented by the infrastructure orchestrator of the serverless framework by running fake functions (sending fake requests) just before the real workload is expected to arrive (see, e.g., FIG. 8). In this manner, embodiments provide a proactive auto-scaling approach for serverless computing implemented within a private cloud hosting solution or a public cloud hosting solution.

Terminology

The terms "connected" or "coupled" and related terms are used in an operational sense and are not necessarily limited to a direct connection or coupling. Thus, for example, two devices may be coupled directly, or via one or more intermediary media or devices. As another example, devices may be coupled in such a way that information can be passed there between, while not sharing any physical connection with one another. Based on the disclosure provided herein, one of ordinary skill in the art will appreciate a variety of ways in which connection or coupling exists in accordance with the aforementioned definition.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

The phrases "in an embodiment," "according to one embodiment," and the like generally mean the particular feature, structure, or characteristic following the phrase is included in at least one embodiment of the present disclosure, and may be included in more than one embodiment of the present disclosure. Importantly, such phrases do not necessarily refer to the same embodiment.

A "serverless framework" generally refers to a serverless computing platform or architecture that provides serverless computing. Non-limiting examples of existing serverless framework offerings include open-source solutions, such as, OpenFaas, OpenWhisk, OpenLambda, Knative Serving, Fission, and commercial solutions, such as, AWS Lambda, Microsoft Azure Functions, and Google Cloud Functions.

A "performance metric" generally refers to a metric relating to an application running within a serverless framework capable of measurement or observation. Non-limiting examples of performance metrics include a QoS metric (e.g., packet loss, bit rate, error rates, throughput, transmission delay, delay variation, availability, jitter, latency, and the like), an SLA metric (e.g., query response time, request inter arrival times, service availability, defect rates, security performance, data rates, throughput, jitter, mean time between failures, mean time to repair, mean time to recovery, and the like) or other application performance metrics (e.g., average response time, error rates, count of application instances, request rate, application CPU/memory/bandwidth utilization, application availability, garbage collection, number of concurrent users, used/available resources, and the like). While embodiments described herein use query or transaction response time as an example target performance metric, those skilled in the art will appreciate, the approach described herein is applicable to various other performance metrics. Similarly, while embodiments described herein consider an example feedback control loop in which the goal is to maintain 90% of the target response time measurements/observations lower than a specified threshold (referred to herein as the target value of the performance metric), other percentages may also be used.

A "feedback control system" or a "feedback control loop" generally refers to a system, including a controller, in which the performance of an application running within a serverless framework is measured or observed, and some parameter or characteristic (e.g., the number of replicas running a particular application) of the serverless framework is adjusted based at least in part on the measured or observed performance.

A "replica" generally refers to the unit of replication employed by the auto-scaling functionality of a serverless computing platform to provision or de-provision resources to accommodate workload being experienced or expected to be experienced by an application. Some serverless computing platforms run containers directly and therefore a container is the unit of replication for such serverless computing platforms. Other serverless computing platforms, such as Kubernetes, may wrap one or more containers into a higher-level structure called a "pod" and therefore a pod is the unit of replication for such serverless computing platforms.

FIG. 1 is a block diagram conceptually depicting interactions among a server 130, a private cloud 110 and a public cloud 120 in accordance with an embodiment. In the context of the present example, the private cloud 110 runs a serverless framework 111 to provide serverless computing services on behalf of developers of an enterprise, for example. The private cloud 110 may be managed by a third party on behalf of the enterprise or may be managed by the enterprise. The developers may launch hundreds or thousands of lightweight tasks in the form of functions and submit these tasks to the private cloud 110 to be run on the shared runtime environment provide by the serverless framework 111. The serverless framework 111 includes an infrastructure orchestrator 112 that may automatically provision and de-provision containers 113*a-n* to provide applications 114*a-n* with sufficient resources to process and respond to the requests submitted by the developers. As noted above, there are a variety of existing serverless framework offerings including open-source solutions as well as commercial solutions.

In the context of the present example, the public cloud 120 is also shown including a serverless framework 111 to provide serverless computing services. As with the private cloud 110, the serverless framework 121 of the public cloud 120 includes an infrastructure orchestrator 122 that may automatically provision and de-provision containers 123a-n to provide applications 122a-n with sufficient resources to process and respond to the requests to be processed by the applications 124a-n.

While there are various differences between public and private clouds, including the party responsible for management, maintenance and updating of the data center in which the cloud is hosted, for the purposes of the present disclosure, the ability to control the auto-scaling functionality is the feature that distinguishes the interactions of various embodiments with these two different types of cloud hosting solutions. In the context of a private cloud, such as private cloud 110, the enterprise has administrative capabilities to scale the number of replicas (e.g., containers) or may otherwise be in a position to implement the auto-scaling functionality performed by the infrastructure orchestrator 112, whereas in the context of a public cloud, such as private cloud 110, the serverless framework 121 typically scales the number of replicas based on the amount of workload. While the server 130 is shown outside of and interacting with both the private cloud 110 and the private cloud 120, depending upon the particular implementation, the server 130 may interact with one or both of the private cloud 110 and the public cloud and may be implemented on a physical or virtual machine within the private cloud 110 or the public cloud 120. Furthermore, in one embodiment, the functionality described herein as associated with the server 130 may be incorporated within or otherwise directly control the auto-scaling functionality implemented by the infrastructure orchestrator 112.

Turning now to the server 130, it may have an interface 115, 125 with one or both of the serverless framework 111 of the private cloud 110 and the serverless framework 121 of the public cloud 120. Depending upon the particular implementation, the server 130 includes one or both of a prediction model 131 and a control architecture 132. According to one embodiment, the server 130 may send a number of replicas (e.g., representing the scaling decision) to the serverless framework 111 via interface 115. For purposes of collecting metrics, the server 130 may also send via interface 115 a metric reporting time interval to the serverless framework 111. Then, for each metric reporting time interval, the serverless framework 111 may send various metrics (e.g., response time, QPS, queuing delay, and throughput) to the server 130 via interface 115. According to one embodiment, the server 130 sends fake requests via interface 125 to the serverless framework 121 to indirectly manage the number of replicas. The server 130 may also collect various metrics with the official monitoring system (e.g., cloudwatch in AWS) of the public cloud, which measures function execution time.

Non-limiting examples of other information that may be sent/received via interfaces 115 and 125 include various performance metrics and/or other variables that may be monitored, measured, reported or otherwise observed on a continuous, real-time, periodic and/or event-driven basis. The monitored performance metrics may include a particular metric of interest (at times referred to herein as a target performance metric) that is desired to be maintained at a particular value for a given percentage of observations of the target performance metric. As described in further detail below, the prediction model 131 generally performs an estimation regarding future requests expected to be received by the applications 114a-n, 124a-n or a particular application at issue. In one embodiment, the estimation is performed in real-time to support processing of the control architecture 132 in connection with determining an optimal amount of resources for the applications 114a-n, 124a-n or the particular application at issue. As described further below, the control architecture 132 may make its determination based on a target value of a performance metric associated with the applications 114a-n, 124a-n or the particular application at issue, past values of the performance metric or historical information regarding the performance metric associated with the applications 114a-n, 124a-n or the particular application at issue, and a past number of replicas in use at a particular time in support of the applications 114a-n, 124a-n or the particular application at issue. The control architecture 132 may base its determination on a periodically predicted workload, based on real-time measurements of various monitored metrics and variables.

In the context of a private cloud embodiment, the auto-scaling algorithm may be represented by, modified in accordance with or directly or indirectly controlled by the workload prediction algorithm described herein. In contrast, in the context of a public cloud embodiment, in which the auto-scaling algorithm is incapable of being changed, the target performance metric may be monitored and the auto-scaling algorithm may be treated as a black box and triggered to avoid cold start latency by issuing fake requests just prior to the predicted workload.

Figure 2A:
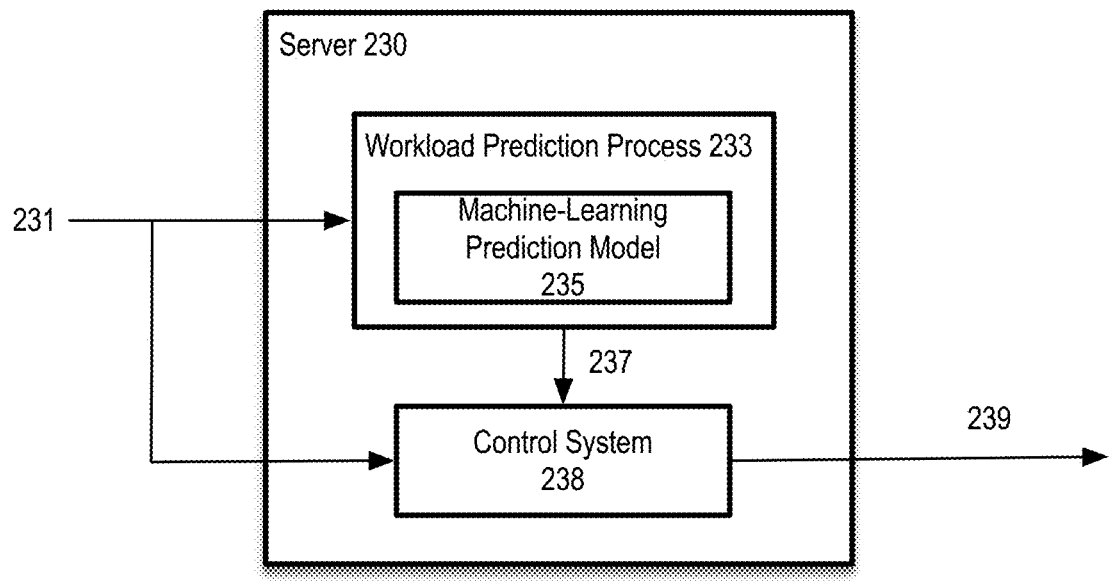
FIG. 2A is a block diagram of illustrating functional units of a server in accordance with an embodiment.

FIG. 2A is a block diagram of illustrating functional units of a server 230 in accordance with an embodiment. In the context of the present example, the server 230 includes a workload prediction process 233 and a control system 238. In general, the workload prediction process performs an estimation of future workload and the control system 238 produces an output 239 to cause the number of replicas for the application at issue to be dynamically auto-scaled.

In the context of a private cloud embodiment, the control system 238 may be a feedback control system that determines an optimal amount of resources so as to allow an application to handle the estimated future workload. Based on the amount of resources expected to be consumed by the future workload and the computing capabilities of the replicas, a number of replicas can be determined by the control system 238 based thereon. While for sake of brevity, various embodiments are described in the context of homogeneous architectures, in which containers are homogeneous and have the same computing capabilities, the methodologies described herein are equally applicable to heterogeneous architectures in which the containers available within the serverless infrastructure (e.g., serverless framework 111 or 121) might have differing computing capabilities including, for example, the type and capacity of memory and, for example, the type, clock speed, single thread performance, and number of cores of processing resources (e.g., microcontrollers, microprocessors, central processing units (CPUs), CPU core(s), application-specific integrated circuits (ASIC), graphics processing units (GPUs), tensor processing units (TPUs), and the like).

In a private cloud embodiment in which the auto-scaling functionality of the serverless infrastructure is directly accessible (for example, by the enterprise making use of the private cloud), a proactive control-theory based approach may be employed where a prediction model (e.g., machine learning prediction model 235) facilitates handling of the fluctuating resource usage pattern. Inputs 231 to the workload prediction process 233 may include one or more of a target performance metric, a previous number of replicas in use at prior times and past values of the target performance metric at the prior times. An output 237 of the workload prediction process 233 may be in the form of a number of future requests estimated to be received at or by a future time. The output 237 can then be used as an input to the control system 238 to determine an output 239 of the control system 238. According to one embodiment, the output 239 is a suggested number of replicas to be provisioned for the application at issue (e.g., one of applications 114a-n) to accommodate the workload represented by the estimated future requests.

According to one embodiment, the control system 238 includes a controller and is part of a feedback control loop. Non-limiting examples of the controller include a proportional-integral-derivative (PID) controller and a proportional integral (PI) controller. As understood by those skilled in the art, a PI controller is a special case of a PID controller in which the derivative (D) of the error is not used. Further details regarding a feedback control loop that may be used in accordance with an embodiment is provided below with reference to FIG. 2B.

In a public cloud embodiment in which the auto-scaling functionality of the serverless infrastructure is not accessible (for example, by the enterprise making use of the public cloud), the same general model may be used; however, the control system 238 can be simplified. For example, rather than the output 239 of the control system 238 representing a number of replicas, the output 239 may represent a number and/or type of fake requests to be issued to the serverless infrastructure (e.g., serverless framework 121) to trigger the embedded auto-scaling functionality of the serverless framework.

Turning now to the machine-learning prediction model 235, in one embodiment, in order to proactively provision a sufficient number of replicas (in the case of a private cloud) or proactively trigger auto-scaling functionality to provision or de-provision replicas (in the case of a public cloud) to maintain compliance with an SLA, for example, as noted above, the future workload demands of an application are predicted ahead of time. Those skilled in the art will appreciate that a number of machine-learning techniques including, but not limited to, support vector regression (SVR) models and deep learning models (e.g., deep neural networks (DNNs)) can be trained to make predictions based on historical observations. Depending upon the particular implementation, a variety of classical machine-learning techniques might be appropriate for use as the machine-learning prediction model 235.

In a serverless framework, since any delay in the prediction phase can impact the performance as it adds more delay to container startup latency, prediction time is a factor to be considered in selecting an appropriate machine-learning prediction model. As empirical data suggests SVR models to be the most accurate of machine learning algorithms for the purpose of predicting cloud workloads (due in part to training and prediction overhead of DNNs), various examples provided herein are described with reference to the use of SVR models. According to one embodiment, a radial basis function (RBF) SVR kernel is used to train the machine-learning prediction model 235 to predict workload bursts. In alternative embodiments various other SVR kernels may be used including, but not limited to, linear, polynomial, and sigmoid SVR kernels.

Figure 2B:
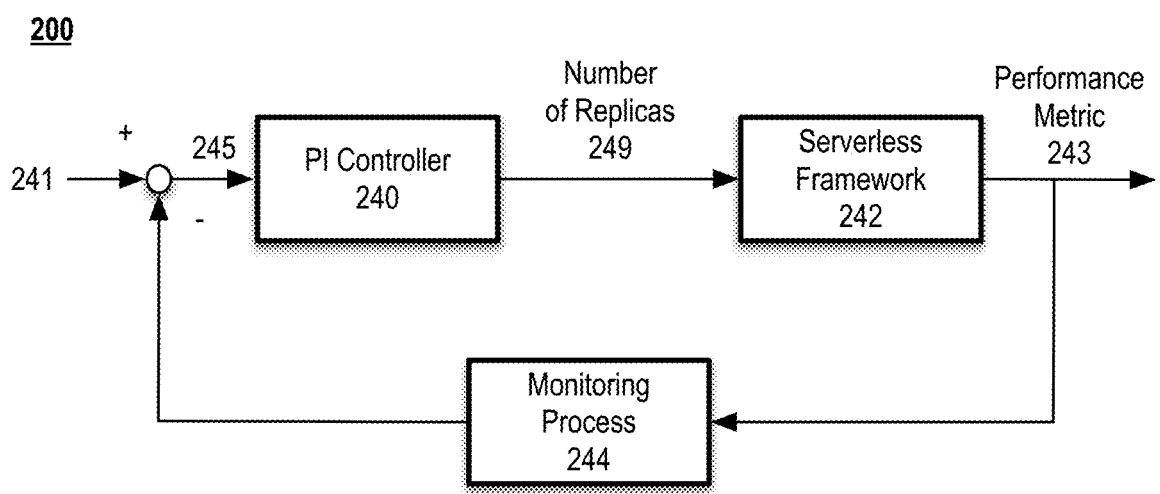
FIG. 2B is a block diagram illustrating a feedback control loop in accordance with a private cloud embodiment.

FIG. 2B is a block diagram illustrating a feedback control loop 200 in accordance with a private cloud embodiment. As those skilled in the art will appreciate, linear feedback control systems generally involve a controller that applies a correction to a controlled variable based on the difference between the desired value (referred to as the setpoint) and a measured value (referred to as the process variable). In the context of the present example, the feedback control loop 200 includes a PI controller 240, a serverless framework 242 and a monitoring process 244.

According to one embodiment, the PI controller 240 dynamically changes of a number of replicas 249 for an application (e.g., one of applications 114a-n) based on a target value of a performance metric 241 and a measured value of the performance metric 243. For example, the PI controller 240 may receive as an input the difference or error 245 between the target performance metric 241 and the performance metric 243 measured by the monitoring process 244. According to one embodiment, the monitoring process 244 continuously monitors the performance metric 243 during each prediction window of time. While embodiments described herein consider an example monitoring process in which the performance metric of interest is sampled one time during a window of time W, other monitoring rates may also be used. Additionally, the predefined window of time may be dynamically increased or decreased in size depending upon various factors (e.g., the workload variation over the current observation window) as described below.

For purposes of illustration, various examples described herein will use an invocation rate (e.g., queries per second) as an example of a measure of workload and a given percentile response time (e.g., 90 percentile response time) as the target performance metric 243. Notably, as indicated above, the methodology described herein is not limited to any particular performance metric, but rather is generally applicable to any desired SLA or QoS metric. Furthermore, the target performance metric may represent a logical condition or a function of a combination of multiple SLA or QoS metrics. Similarly, while for sake of illustration an example of the proposed approach involves keeping 90 of 100 (90%) of the query response times lower than a threshold (e.g., specified by an SLA), other ratios/percentages and/or thresholds may be employed and may be initially configured and/or adjusted based on a variety of external or internal sources (e.g., user input, a configuration file, an SLA, etc.).

According to one embodiment, the serverless framework 242 is treated as the dynamic system to be controlled by the output of the PI controller 240. For purposes of illustration, an example will now be described with the performance metric 243 output by the dynamic system being a response time (Res(k)) and a number of replicas (R(k)) being the input to the dynamic system. In this example, the goal is to dynamically scale the number of replicas so as to maintain a threshold (e.g., 90%) of the observed response times at or above a target value (reference value ($Res_{ref}$)). Stated another way, the reference value ($Res_{ref}$) indicates the value below which a given percentage of target value observations fails. Continuing with the present example, PI controller 240 can be represented as follows:

$$R(k)=R(k-1)+(K_p+K_I)E(k)-K_pE(k-1) \qquad \text{Eq. #1}$$

where $$E(k)=Res_{ref}-Res(k) \qquad \text{Eq. #2}$$

and where, k represents the time for which the new number of replicas is being calculated.

R(x) represents the number of replicas at time x.

E(x) represents the error in response time at time x.

$Res_{ref}$ is a response time value below which a given percentage (e.g., 10%) of target value observations fail.

Res(k) is the response time at time k.

$K_p$ represents the proportional gain, one of the tuning parameters of the controller.

$K_I$ represents the integral gain, another tuning parameter of the controller.

According to various embodiments, the parameters of the PI controller 240 are tuned so as to provide stability and avoid thrashing in relation to the new number of replicas output by the PI controller 240. In one embodiment, the tuning approach described in J. G. Ziegler and N. B. Nichols. Optimum settings for automatic controllers. trans. ASME, 1942, which is incorporated herein by reference in its entirety for all purposes (the "Ziegler-Nichols method"), is used to find the tuning parameters of the PI controller 240, by first setting $K_I$ in Eq. #1 to zero and then incrementally increasing the proportional gain (Kp) of Eq. #1 until it reaches the ultimate gain $K_u$ at which the response time starts to oscillate (see, e.g., FIG. 7). Let $K_u$ be the gain and $T_u$ be the oscillation period. Then, $K_p$ of Eq. #1 is set to a fraction of $K_u$ (e.g., $0.45K_u$) and $K_I$ is set to a fraction of a function of $K_u$ and $T_u$ (e.g., $0.54K_u/T_u$). The new number of replicas (R(k)) resulting from this calculation is then rounded to the closest integer to avoid fractional values. As those skilled in the art will appreciate, other turning approaches may be used. For example, as an alternative to the Ziegler-Nichols tuning method, tuning values may be determined by the TLC tuning rules created by Tyreus and Luyblen.

While for purposes of providing a concrete example, Eq. #1 and Eq. #2 (above) are expressed with reference to a particular target performance metric (i.e., response time), those skilled in the art will appreciate these equations can be used for any desired target performance metric by simply substituting the desired target performance metric for the response time (Res(k)) in Eq. #2 and substituting a reference value for the desired target performance metric for the response time reference value ($Res_{ref}$) in Eq. #2.

While various parameter tuning and performance metric monitoring examples provided herein are described with reference to a PI controller, because a PI controller is a special case of a PID controller, those skilled in the art will appreciate the examples are equally applicable to PID controllers.

Figure 3:
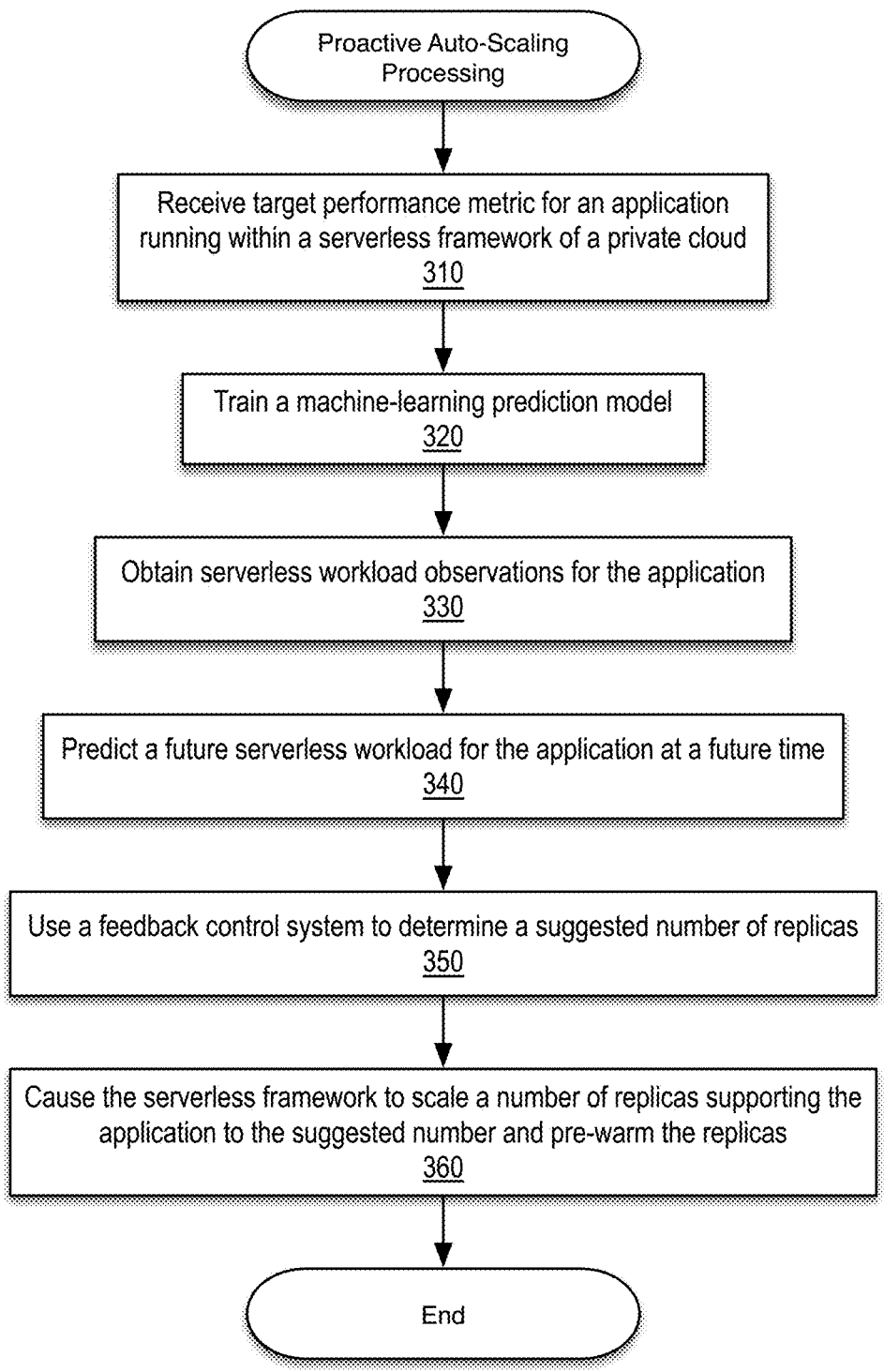
FIG. 3 is a flow diagram illustrating proactive auto-scaling processing for a private cloud in accordance with an embodiment.

FIG. 3 is a flow diagram illustrating proactive auto-scaling processing for a private cloud in accordance with an embodiment. The processing described with reference to FIG. 3 may be implemented in the form of executable instructions stored on a machine readable medium and executed by a processing resource (e.g., a microcontroller, a microprocessor, central processing unit core(s), an application-specific integrated circuit (ASIC), a field programmable gate array (FPGA), and the like) and/or in the form of other types of electronic circuitry. For example, this processing may be performed by one or more computer systems of various forms, such as the servers 130 and 230 illustrated in FIGS. 1 and 2A and/or the computer systems described with reference to FIGS. 9 and 10 below. For sake of brevity, this flow diagram and the below description focus on processing related to various aspects of proactively auto-scaling a number of replicas in the context of a serverless framework (e.g., serverless framework 111) implemented by a private cloud (e.g., private cloud 110). Those skilled in the art will appreciate the components of the serverless framework may perform various other operations and processing (e.g., monitoring, reporting and/or processing infrastructure events) in connection with providing or otherwise supporting applications 114a-n).

At block 310, a target performance metric is received for an application running within a serverless framework of a private cloud. According to one embodiment, the target performance metric represents a QoS metric or a particular performance metric specified by an SLA. Alternatively, the target performance metric may represent a logical condition or a function of a combination of multiple SLA and/or QoS metrics. For example, the goal of the proactive auto-scaling processing may be to keep some predetermined or configurable threshold number of every 100 measurements of the performance metric at issue to be higher or lower, as the case may be, than another predetermined or configurable threshold (e.g., a threshold specified by an SLA).

At block 320, a machine-learning prediction model is trained. According to one embodiment, an RBF SVR kernel is used to train the machine-learning prediction model based on time series workload information (e.g., historically observed workload information or past workload information for a window of time up to and including the current time). Further details regarding an example training process is provided below with reference to FIG. 6.

At block 330, serverless workload observations for the application are obtained. According to one embodiment, the observations are measurements obtained by calling an application programming interface (API) exposed by a serverless framework. As described above with reference to FIG. 2B, in one embodiment, a monitoring process continuously monitors a value of a performance metric at issue as part of a feedback control loop and maintains the measured/observed values over a predefined window of time. As described further below, in one embodiment, the predefined window of time may be dynamically increased or decreased in size depending upon various factors (e.g., the workload variation over the current observation window).

At block 340, a future serverless workload is predicted for an application at issue for a future time. According to one embodiment, the prediction is performed by providing the trained machine-learning prediction model with the feature vector in a form of the monitored workload information obtained over the predefined window of time. In one embodiment, the workload prediction represents a prediction, as of the current time within a monitoring window, of the number of queries per second (QPS) expected to be received by the application at a future time. As an alternative to the number of queries per second, other workload characteristics can be predicted (e.g., CPU/memory/network bandwidth utilization) over time. An example of workload prediction processing is described further below with reference to FIG. 5.

At block 350, a feedback control system is used to determine a suggested number of replicas. According to one embodiment, the feedback control system receives as an input information regarding an expected future workload for an application during a future timeframe and outputs a number of replicas for the application for the future time as a function of the future workload prediction, a target value of a particular performance metric and a current value of the particular performance metric. For example, the feedback control system determines an optimal amount of resources that will enable the application to handle, at the future time, a number of transactions, queries or requests that has been predicted by the machine-learning prediction model will be received at the future time while satisfying an application performance target. Then, based on the determined amount of resources and other factors (e.g., the computing capabilities of the replicas), a number of replicas can be calculated. According to one embodiment, Eq. #1 and Eq. #2 can be used for a desired target performance metric by replacing the response time (Res(k)) in Eq. #2 with the desired target performance metric and replacing the response time reference value ($Res_{ref}$) in Eq. #2 with a reference value for the desired target performance metric.

At block 360, the serverless framework is caused to scale a number of replicas supporting the application to the suggested number of replicas determined in block 350 and to pre-warm the replicas. According to one embodiment, the feedback control system may be incorporated within or otherwise (e.g., by way of being granted appropriate permissions/access) directly control the auto-scaling functionality implemented by the serverless framework of the private cloud.

Figure 4:
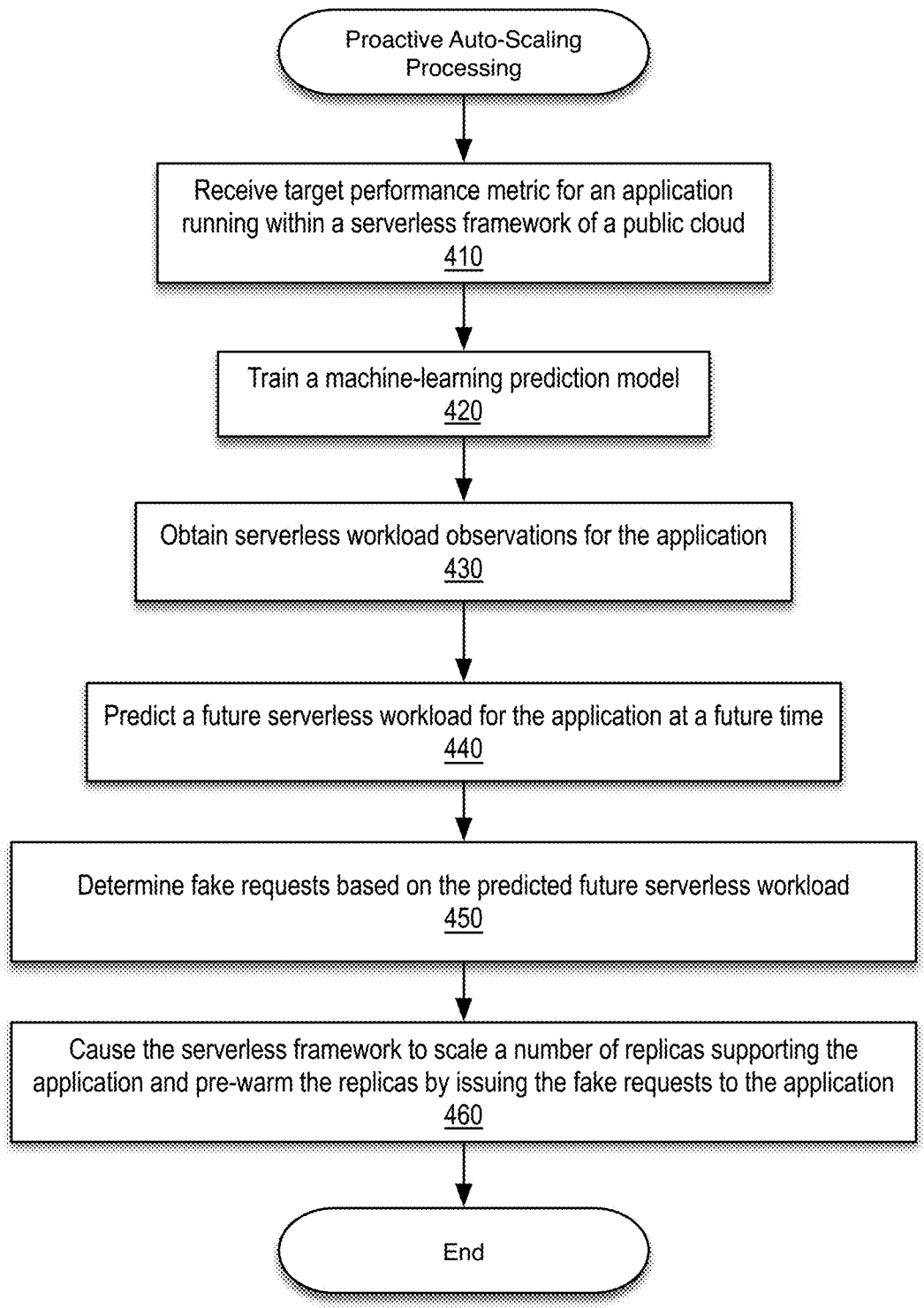
FIG. 4 is a flow diagram illustrating proactive auto-scaling processing for a public cloud in accordance with an embodiment.

FIG. 4 is a flow diagram illustrating proactive auto-scaling processing for a public cloud in accordance with an embodiment. As above, the processing described with reference to FIG. 4 may be implemented in the form of executable instructions stored on a machine readable medium and executed by a processing resource (e.g., a microcontroller, a microprocessor, central processing unit core(s), an ASIC, an FPGA, and the like) and/or in the form of other types of electronic circuitry. For example, this processing may be performed by one or more computer systems of various forms, such as the servers 130 and 230 illustrated in FIGS. 1 and 2A and/or the computer systems described with reference to FIGS. 9 and 10 below. For sake of brevity, this flow diagram and the below description focus on processing related to various aspects of proactively triggering auto-scaling functionality implemented by an infrastructure orchestrator (e.g., infrastructure orchestrator 122) of a serverless framework (e.g., serverless framework 121) implemented by a public cloud (e.g., public cloud 120). Those skilled in the art will appreciate the components of the serverless framework may perform various other operations and processing (e.g., monitoring, reporting and/or processing infrastructure events) in connection with providing or otherwise supporting applications 124a-n).

At block 410, a target performance metric is received for an application running within a serverless framework of a public cloud. According to one embodiment, the target performance metric represents a QoS metric or a particular performance metric specified by an SLA. Alternatively, the target performance metric may represent a logical condition or a function of a combination of multiple SLA and/or QoS metrics. For example, the goal of the proactive auto-scaling processing may be to keep some predetermined or configurable threshold number of every 100 measurements of the performance metric at issue to be higher or lower, as the case may be, than another predetermined or configurable threshold (e.g., a threshold specified by an SLA).

At block 420, a machine-learning prediction model is trained. According to one embodiment, an RBF SVR kernel is used to train the machine-learning prediction model based on time series workload information (e.g., historically observed workload information or past workload information for a window of time up to and including the current time). Further details regarding an example training process is provided below with reference to FIG. 6.

At block 430, serverless workload observations for the application are obtained. According to one embodiment, the observations are measurements obtained by calling an API exposed by a serverless framework. In one embodiment, a monitoring process continuously monitors a value of a performance metric at issue and maintains the measured/observed values over a predefined window of time. As described further below, in one embodiment, the predefined window of time may be dynamically increased or decreased in size depending upon various factors (e.g., the workload variation over the current observation window).

At block 440, a future serverless workload is predicted for an application at issue for a future time. According to one embodiment, the prediction is performed by providing the trained machine-learning prediction model with the feature vector in a form of the monitored workload information obtained over the predefined window of time. In one embodiment, the workload prediction represents a prediction, as of the current time within a monitoring window, of the number of queries per second (QPS) expected to be received by the application at a future time. An example of workload prediction processing is described further below with reference to FIG. 5.

At block 450, a determination is made regarding a type and/or a number of fake requests based on the predicted future serverless workload. In one embodiment, fake requests are used to indirectly manage autoscaling in public clouds. The fake requests are used in the context of a public cloud embodiment since public clouds (unlike serverless frameworks on private clouds) do not provide control of the scaling mechanism for users. In the context of a serverless framework in a public cloud receiving simultaneous requests, the serverless framework launches the same number of containers to serve the requests at the same time. In various embodiments, the output of the workload prediction model described above is used to predict the future workload at time t+d and this prediction is used to send fake requests at time t to trigger the public cloud's auto-scaling component. With this observation, the predicted number of fake requests that are decided by the prediction algorithm, for example, running on server 130 of FIG. 1 are sent to the public cloud to cause the right number of containers to be launched for future requests.

At block 460, the serverless framework is caused to scale a number of replicas supporting the application and pre-warm the replicas by issuing the fake requests to the application. As mentioned above, in a public cloud embodiment, the embedded auto-scaling functionality implemented by the serverless framework may be treated as a black box. For example, because the proactive auto-scaling processing described herein may not have administrative access to change the auto-scaling functionality or otherwise directly control the number of replicas, the output of the prediction model can be used to send fake requests for a short period of time to trigger the embedded auto-scaling functionality.

Figure 5:
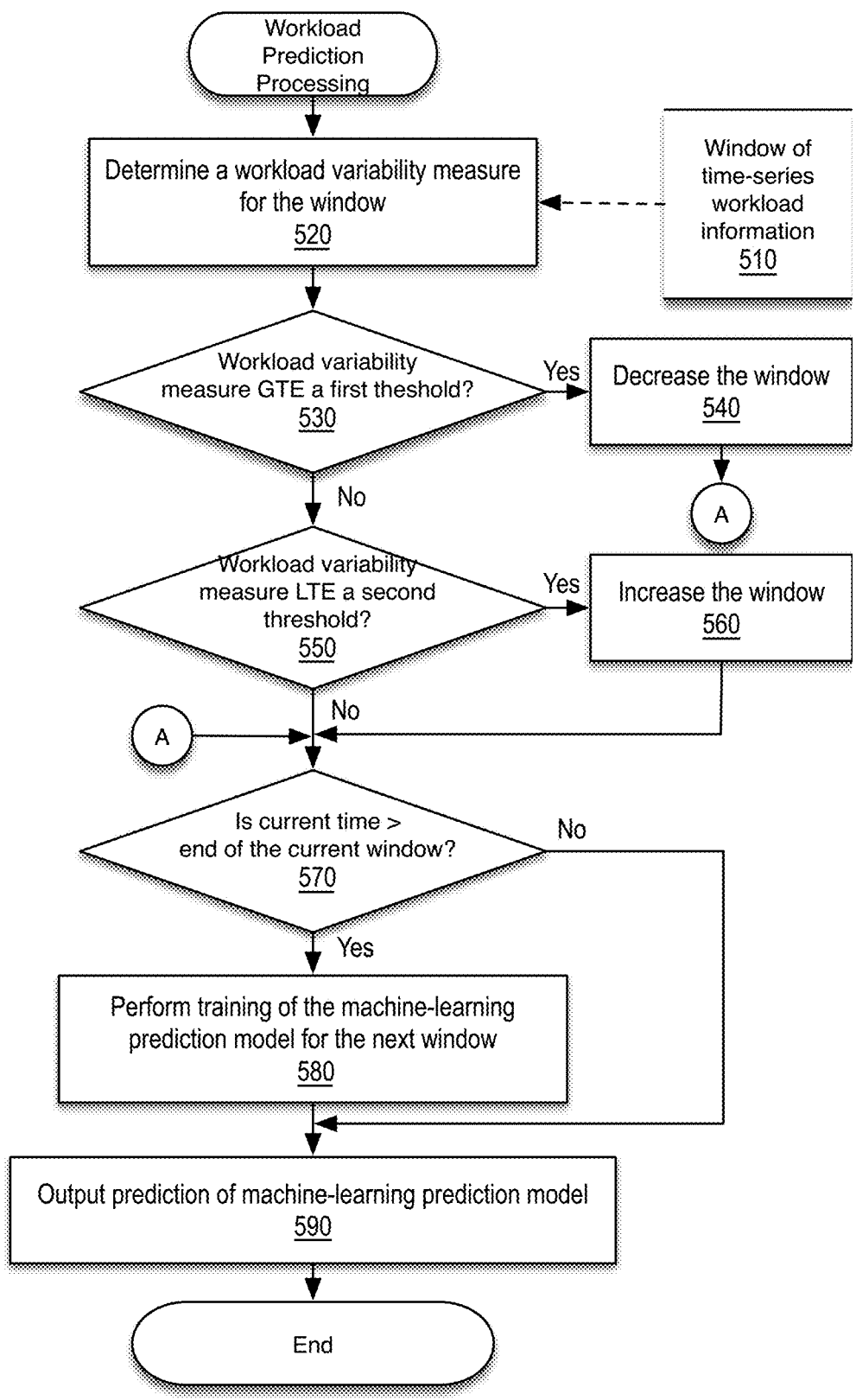
FIG. 5 is a flow diagram illustrating workload prediction processing in accordance with an embodiment.

FIG. 5 is a flow diagram illustrating workload prediction processing in accordance with an embodiment. According to one embodiment, the processing described with reference to FIG. 5 represents the processing performed by block 340 of FIG. 3 and/or block 440 of FIG. 4. As above, the processing described with reference to FIG. 5 may be implemented in the form of executable instructions stored on a machine readable medium and executed by a processing resource (e.g., a microcontroller, a microprocessor, central processing unit core(s), an ASIC, an FPGA, and the like) and/or in the form of other types of electronic circuitry. For example, this processing may be performed by one or more computer systems of various forms, such as the servers 130 and 230 illustrated in FIGS. 1 and 2A and/or the computer systems described with reference to FIGS. 9 and 10 below.

For purposes of completeness and without limitation, a pseudo code example of a workload prediction algorithm ("Algorithm 1") is presented below following the more general description provided with reference to FIG. 5.

In one embodiment, the workload prediction represents a future d-unit of time workload at time t during a default window size of W and the machine-learning model is periodically retrained with a fresh set of workload observations. As those skilled in the art will appreciate, the coefficient of determination of a prediction model decreases the further in the future a prediction is attempted. Therefore, more accurate predictions can be achieved by performing the prediction process more frequently. In one embodiment, the workload prediction process is performed every W seconds where W may change dynamically as described further below.

According to one embodiment, the default window size (W) is between approximately 10 and 90 seconds and the prediction time interval (d) is between approximately 1 and 15 seconds. In the context of Algorithm #1 (below), W is 30 seconds and d is 5 seconds. In general, the default window size should be chosen to be large enough to have enough workload samples for training, but should not be too large so that it can respond quickly to bursty workloads. Selection of an appropriate default window size (W) and prediction time interval (d) should also take into consideration the container (function) launching time since launching new containers takes time in order to initialize the containers (e.g., setting up various Linux namespaces for the network, filesystem, etc.). For example, if W and d are shorter than launching a new container, the newly launched container may not be ready to serve the expected future requests in time. Empirical data suggests common container launching times of on the order of between about 6 to 7 seconds.

According to one embodiment, the machine-learning prediction model for predicting future workloads is based on the past observations of the workload over a window size of W time units. For example, a workload prediction at a future time t+d may be made by training an SVR model using the observed/monitored workload information during a window size of [t−W, t]. Then, the trained SVR model may be used to make a regression prediction for the future time t+d. In some embodiments, the window size is changed dynamically based on the workload variations over time. For example, the training window size may be increased when the workload variation over the current window is relatively low as indicated by a threshold and decreased once the workload variation meets or exceeds another threshold.

According to one embodiment, a window of time-series workload information 510 is accessible to the workload prediction processing. For example, the time-series workload information (X) may be in the form of an array, a circular buffer or other suitable data structure and may include workload observations for each unit of time (e.g., one second) employed beginning at time W-t and ending at time t.

At block 520, a workload variability measure is determined for the current window. According to one embodiment, the workload variation over the current window is a function of the maximum observed workload and the minimum observed workload during the current window. For example, the workload variability measure may be calculated by dividing the difference between the maximum observed workload and the minimum observed workload by the minimum observed workload as illustrated below with reference to Algorithm #1.

At decision block 530, it is determined whether the workload variability measure is greater than or equal to (GTE) a first threshold. If so, then processing branches to block 540; otherwise, processing continues with decision block 550. According to one embodiment, the first threshold is between approximately 0.15 and 0.25 (meaning the workload variation is between approximately 15% and 25%). In the context of Algorithm #1 (below), the first threshold is 0.2.

At block 540, the window (W) is decreased so as to capture fewer workload observations due to the relatively high degree of workload variation during the current window. According to one embodiment, W is decreased by a factor of between approximately 1.5 to 2.5. In the context of Algorithm #1 (below), the factor is 2.

At decision block 550, it is determined whether the workload variability measure is less than or equal to (LTE) a second threshold. If so, then processing branches to block 560; otherwise, processing continues with decision block 570. According to one embodiment, the second threshold is between approximately 0.5 and 0.15 (meaning the workload variation is between approximately 5% and 15%). In the context of Algorithm #1 (below), the second threshold is 0.1.

At block 560, the window (W) is expanded so as to capture additional workload observations due to the relatively low degree of workload variation during the current window. According to one embodiment, W is increased by a multiple of between approximately 1.5 to 2.5. In the context of Algorithm #1 (below), the multiple is 2.

At decision block 570, it is determined whether the current time is beyond the end of the current window. If so, then processing continues with block 580; otherwise, processing branches to block 590.

At block 580, the machine-learning prediction model is trained for the next window. Depending upon the particular implementation, the machine-learning prediction model may be based on an SVR model or a deep learning model. According to one embodiment, an RBF SVR kernel is used to train the machine-learning prediction model. In alternative embodiments various other SVR kernels may be used including, but not limited to, linear, polynomial, and sigmoid SVR kernels. Further details regarding an example training process is provided below with reference to FIG. 6.

At block 590, the prediction of the machine-learning prediction model is outputted. According to one embodiment, the prediction represents a predicted future workload at time t+d, where t is the current time. For example, the machine-learning prediction model may predict the application will receive Z QPS at time t+d.

Algorithm #1 Example Workload Prediction Algorithm

For purposes of completeness, a non-limiting pseudo code example of a workload prediction algorithm is presented below:

| | |
|---|---|
| 1. | Input: Feature vector: monitored workload information (X) during a window size of W. |
| 2. | Output: Predicted future workload at time t + d, where t is the current time. |
| 3. | Set the default window size: W = 30 seconds |
| 4. | Save the current time: $prev_t = t$; |
| 5. | $\dfrac{|\max_{i \in W} X(i) - \min_{j \in W} X(j)|}{\min_{j \in W} X(j)} \geq 0.2$, then |

```
6.   W = W/2;
7.   else if  |max_{i∈W} X(i) − min_{j∈W} X(j)|  ≤ 0.1,  then
                    min_{j∈W} X(j)
8.   W = 2W;
9.   if t > prev_t + W, then
10.     SVR-Train(X[t-W,t]); -- See, e.g., Algorithm #2 (below)
11.     output = SVR-Predict(X[t + d]); -- See, e.g., Algorithm #1
12.     prev_t = t;
```

Figure 6:
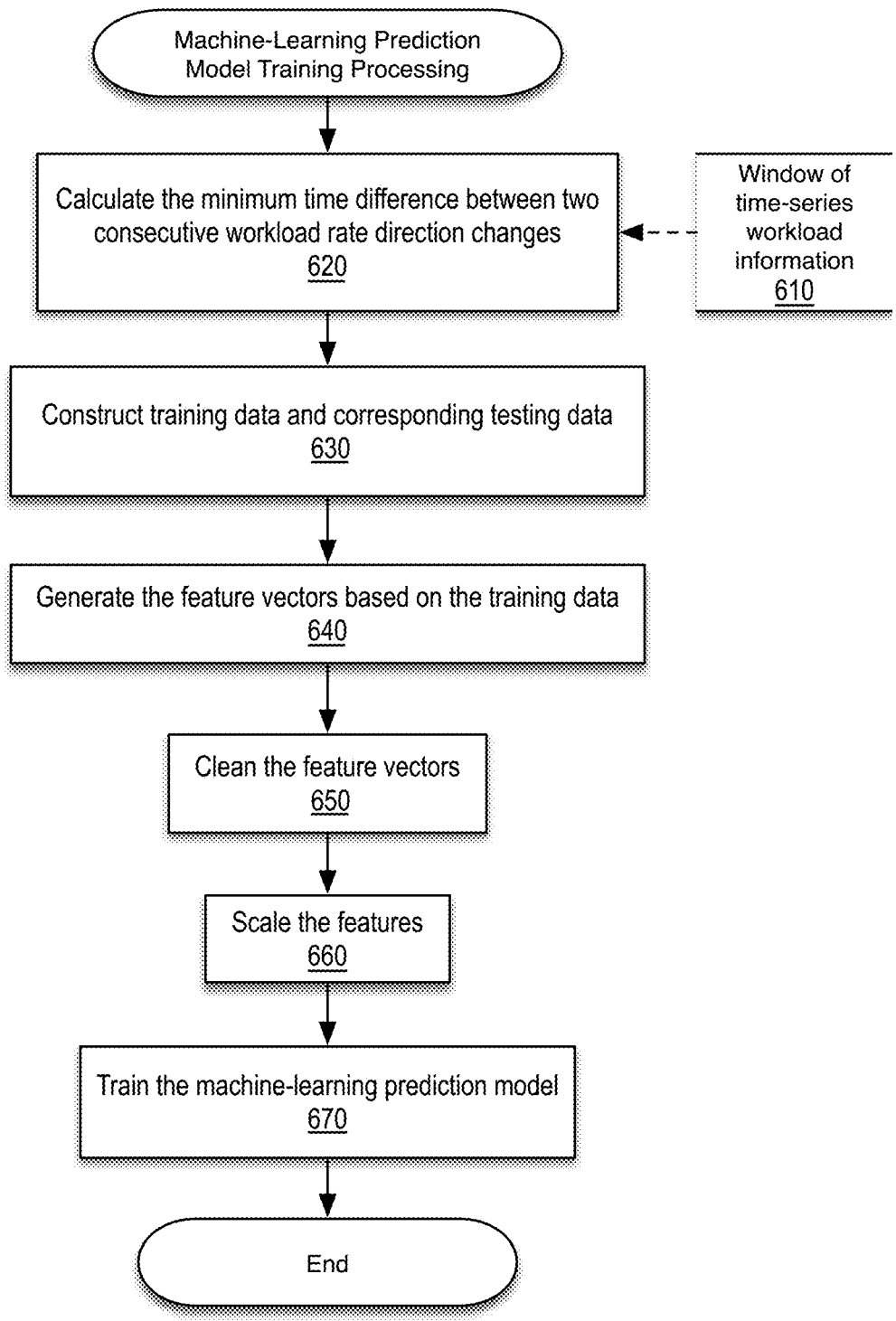
FIG. 6 is a flow diagram illustrating training processing in accordance with an embodiment.

FIG. 6 is a flow diagram illustrating training processing in accordance with an embodiment. According to one embodiment, the processing described with reference to FIG. 6 represents the processing performed by block 320 of FIG. 3 and/or block 420 of FIG. 4. As above, the processing described with reference to FIG. 6 may be implemented in the form of executable instructions stored on a machine readable medium and executed by a processing resource (e.g., a microcontroller, a microprocessor, central processing unit core(s), an ASIC, an FPGA, and the like) and/or in the form of other types of electronic circuitry. For example, this processing may be performed by one or more computer systems of various forms, such as the servers 130 and 230 illustrated in FIGS. 1 and 2A and/or the computer systems described with reference to FIGS. 9 and 10 below.

According to one embodiment, a window of time-series workload information 610 represents an input parameter to or is otherwise made available to the machine-learning prediction model training processing. As noted above, the time-series workload information (X) may be in the form of an array, a circular buffer or other suitable data structure and may include workload observations for each unit of time (e.g., one second) employed beginning at time W-t and ending at time t.

At block 620, a minimum time difference is calculated between two consecutive workload rate direction changes from negative to positive or positive to negative.

At block 630, training data and corresponding testing data are constructed. According to one embodiment, the observed workload (e.g., QPS) in the time interval [t−W,t] at time t is used as training data and the future workload (e.g., QPS), predicted at time t+d is used as the test data. For example, the predicted QPS value can be compared with the actual QPS value that is observed at time t+d. This process may then be repeated for the next time interval over the next window size of W.

At block 640, the feature vectors are generated based on the training data.

At block 650, the feature vectors are cleaned. According to one embodiment, unavailable data is removed, the feature vectors are normalized, and the feature vectors are made unitless.

At block 660, the feature vectors are scaled. According to one embodiment, the feature is scaled to the range of [−1, +1].

At block 670, the machine-learning prediction model is trained based on feature vectors resulting from a dimensionality reduction resulting from performing a principal component analysis (PCA) algorithm.

Algorithm #2—SVR Training Procedure

For purposes of completeness, a non-limiting pseudo code example of a SVR training procedure is presented below:

```
1. Input: Time series workload information (X).
2. Output: SVR Model to predict future d-second workload at time
   t during a window size of W.
3. Calculate the minimum time difference between two consecutive
   workload rate direction changes from negative to positive or
   vice versa (min_{dist}).
4. Construct the training data from t-W to t and the corresponding
   testing data for the future d seconds from t -W+d to t+d.
5. Generate the feature vectors from training data, including
   training data, their respective W, W/2, ..., W=W/2^n moving
   averages, where n > log_2(W=min_{dist}) and the corresponding
   ground truth from the training data.
6. Clean the feature vectors by normalizing, making unitless,
   and removing unavailable data.
7. Scale the feature to the range of [−1; +1].
8. Perform feature reduction using PCA.
9. Get support vector regression model: SvrModel =
   SVR(kernel = 'rbf', gamma = 'auto'). And train the model:
   SvrModel.fit(X_{train},Y_{train}), where X_{train} is a vector of time values and
   the corresponding workload values are stored in vector Y_{train}.
```

Embodiments described herein include various steps, examples of which have been described above. As described further below, these steps may be performed by hardware components or may be embodied in machine-executable instructions, which may be used to cause a general-purpose or special-purpose processor programmed with the instructions to perform the steps. Alternatively, at least some steps may be performed by a combination of hardware, software, and/or firmware.

Embodiments described herein may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to example embodiments described herein with appropriate standard computer hardware to execute the code contained therein. An apparatus for practicing various example embodiments described herein may involve one or more computing elements or computers (or one or more processors within a single computer) and storage systems containing or having network access to computer program(s) coded in accordance with various methods described herein, and the method steps of various example embodiments described herein may be accomplished by modules, routines, subroutines, or subparts of a computer program product.

Figure 7:
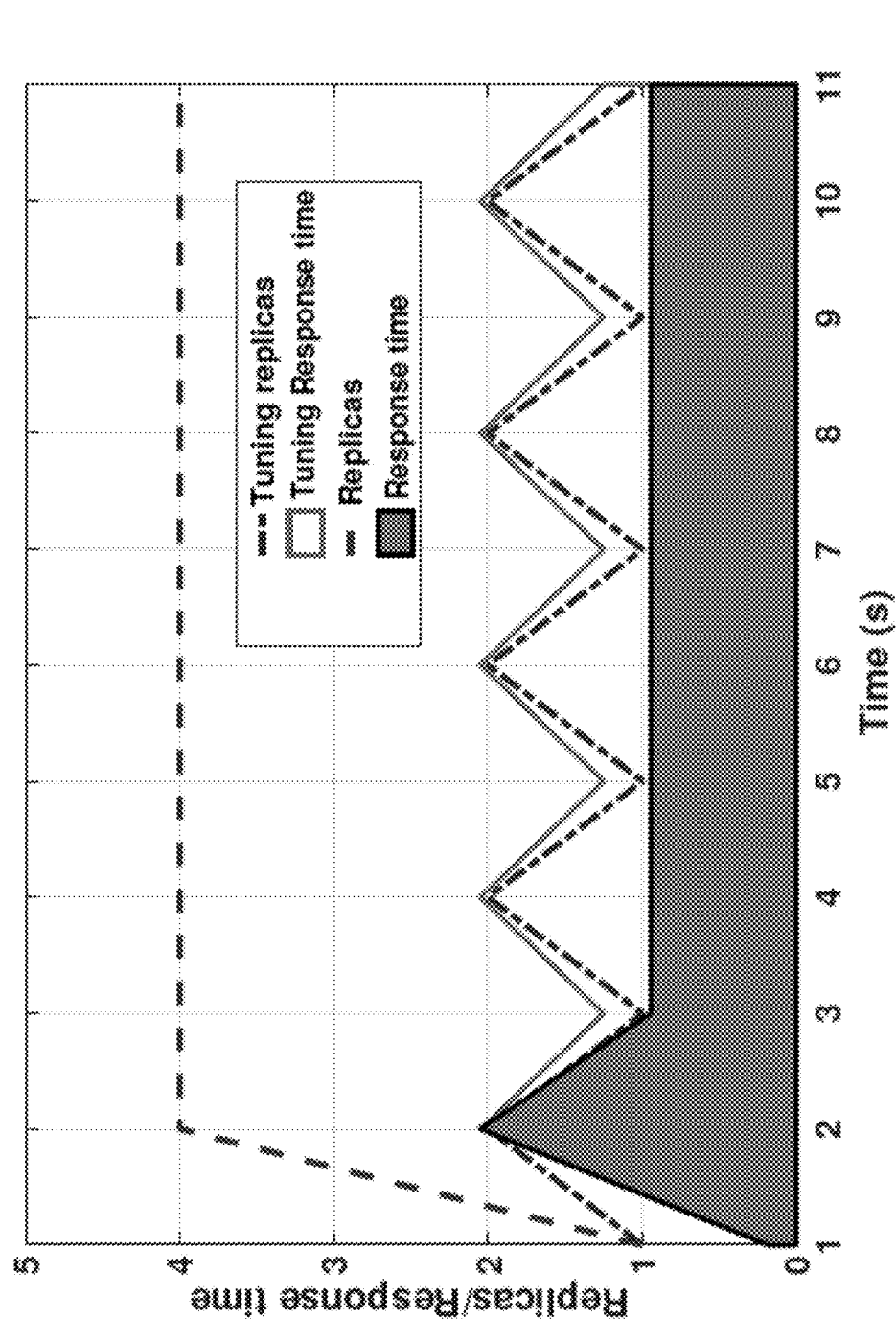
FIG. 7 is a graph illustrating tuning of parameters of a proportional integral (PI) controller in accordance with an embodiment.

FIG. 7 is a graph illustrating tuning of parameters of a proportional integral (PI) controller in accordance with an embodiment. In the context of the present example, the number of replicas and response time are represented on the y-axis and time is represented on the x-axis. As noted above, in one embodiment, the tuning of the PI controller 240 is performed by first setting $K_I$ in Eq. #1 to zero and then incrementally increasing the proportional gain (Kp) of Eq. #1 until it reaches the ultimate gain $K_u$ at which the response time starts to oscillate (e.g., as illustrated in graph 700). At this point, in one embodiment, $K_u$ and the oscillation period $T_u$ can be used to determine the new number of replicas (R(k)) by setting $K_p$ of Eq. #1 to a fraction of $K_u$ (e.g., $0.45K_u$) and setting $K_I$ to a fraction of a function of $K_u$ and $T_u$ (e.g., $0.54K_u/T_u$). In the context of the present example, a steady response time of 1 unit of time is achieved by setting the new number of replicas (R(k)) to 4 as determined by Eq. #1.

Figure 8:
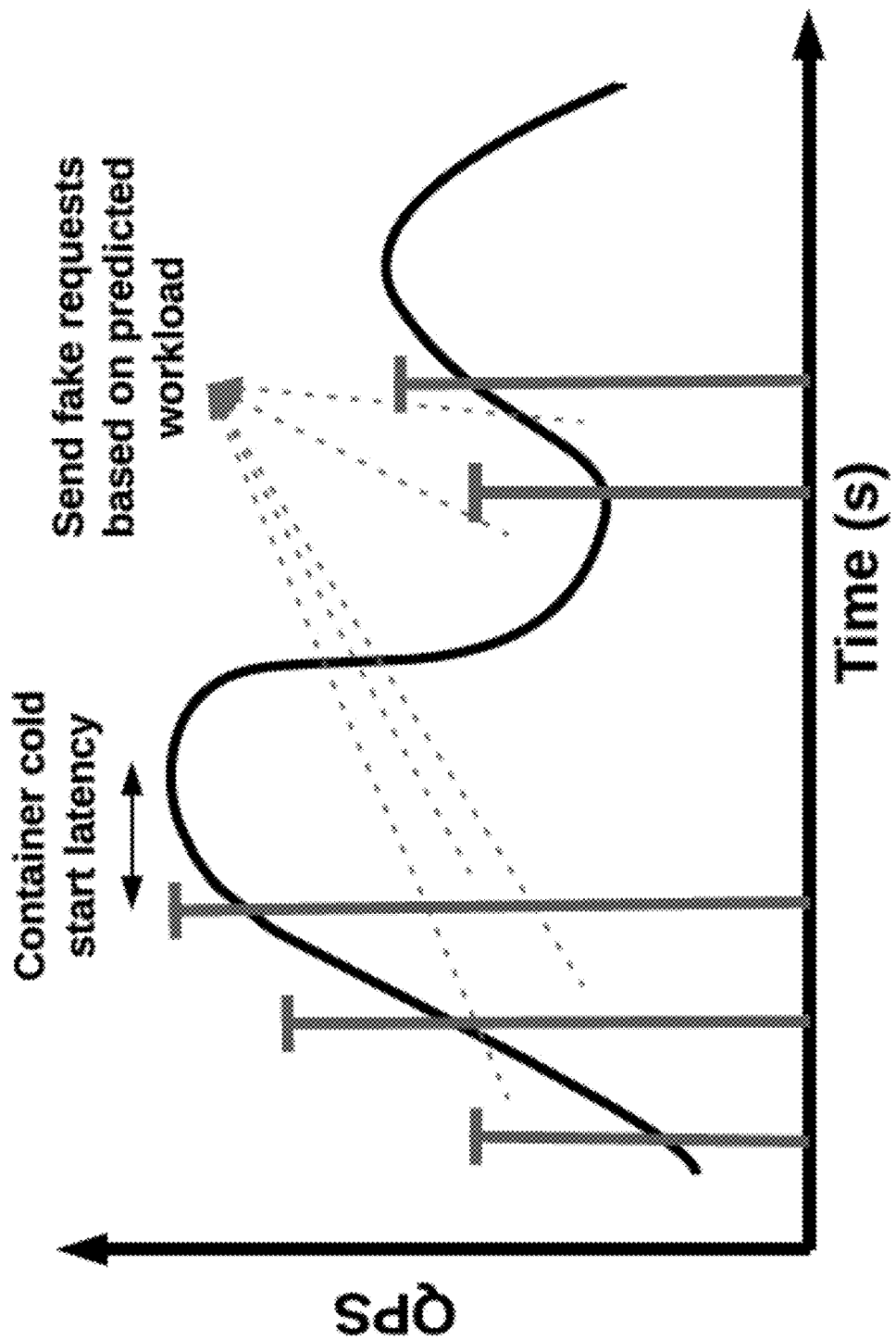
FIG. 8 is a graph illustrating triggering of auto-scaling of replicas in a public cloud based on a predicted workload in accordance with an embodiment.

FIG. 8 is a graph illustrating triggering of auto-scaling of replicas in a public cloud based on a predicted workload in accordance with an embodiment. In the context of the present example, QPS is represented on the y-axis and time is represented on the x-axis. As noted above, in a public cloud embodiment, based on the predicted future serverless workload expected to be experienced by an application running within a serverless framework of the public cloud, fake requests are used to indirectly trigger the serverless framework's autoscaling component. In the context of the present example, the fake requests are sent to the serverless framework prior to the time of the predicted future workload and taking into consideration cold start latency of the unit of replication (e.g., containers).

Figure 9:
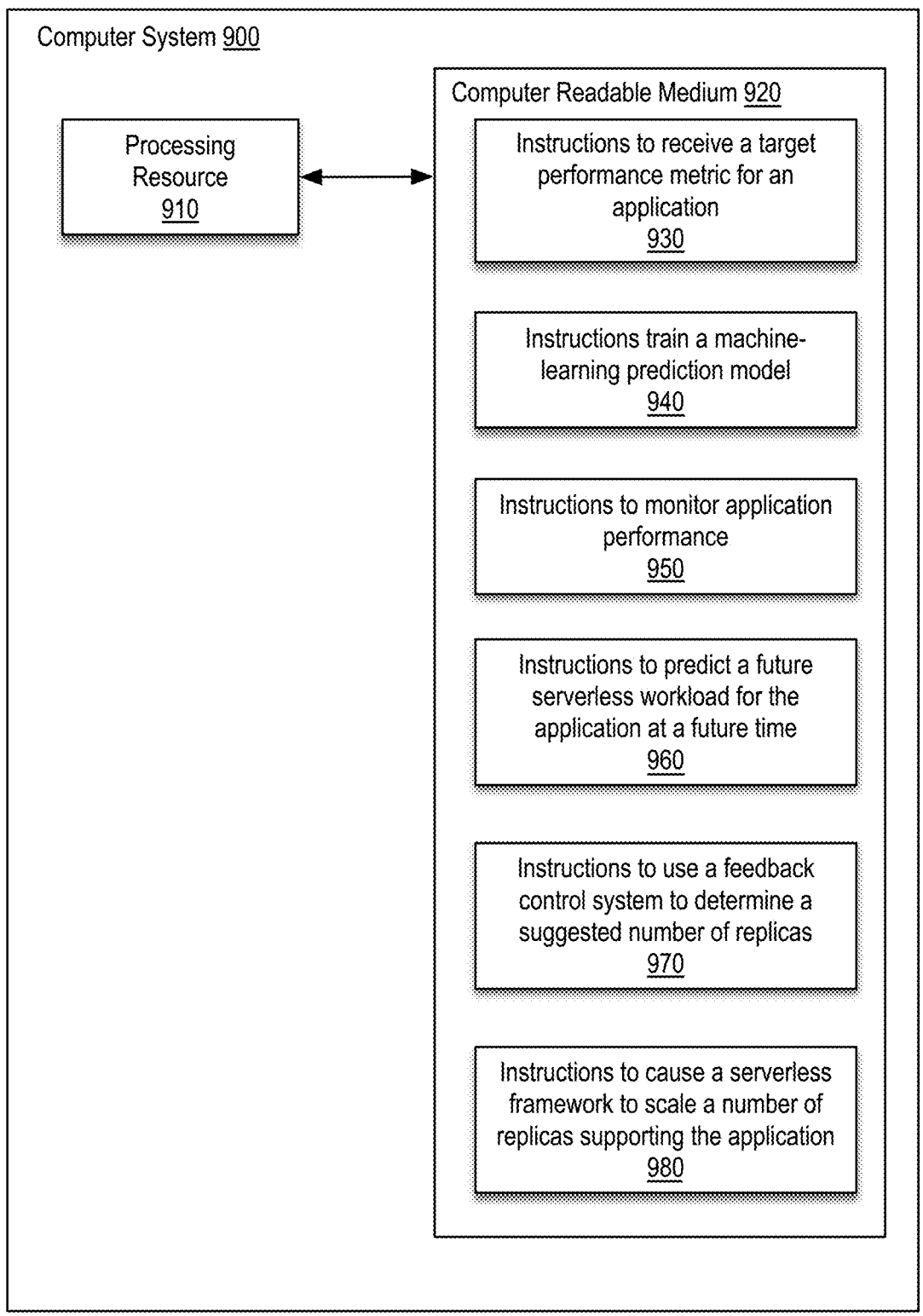
FIG. 9 is a block diagram of a computer system in accordance with an embodiment.

FIG. 9 is a block diagram of a computer system in accordance with an embodiment. In the example illustrated by FIG. 9, computer system 900 includes a processing resource 910 coupled to a non-transitory, machine readable medium 920 encoded with instructions to perform a proactive auto-scaling method in accordance with a private cloud embodiment. The processing resource 910 may include a microcontroller, a microprocessor, central processing unit core(s), an ASIC, an FPGA, and/or other hardware device suitable for retrieval and/or execution of instructions from the machine readable medium 920 to perform the functions related to various examples described herein. Additionally or alternatively, the processing resource 910 may include electronic circuitry for performing the functionality of the instructions described herein.

The machine readable medium 920 may be any medium suitable for storing executable instructions. Non-limiting examples of machine readable medium 920 include RAM, ROM, EEPROM, flash memory, a hard disk drive, an optical disc, or the like. The machine readable medium 920 may be disposed within the computer system 900, as shown in FIG. 9, in which case the executable instructions may be deemed "installed" or "embedded" on the computer system 900. Alternatively, the machine readable medium 920 may be a portable (e.g., external) storage medium, and may be part of an "installation package." The instructions stored on the machine readable medium 920 may be useful for implementing at least part of the methods described herein.

In the context of the present example, the machine readable medium 920 is encoded with a set of executable instructions 930-980. It should be understood that part or all of the executable instructions and/or electronic circuits included within one block may, in alternate implementations, be included in a different block shown in the figures or in a different block not shown.

Instructions 930, upon execution, cause the processing resource 910 to receive a target performance metric for an application. In one embodiment, instructions 930 may correspond generally to instructions for performing block 310 of FIG. 3. For example, instructions 930 may cause processing resource 910 to prompt an end user for the target performance metric via a user interface of computer system 900 or retrieve a QoS metric or a particular performance metric specified by an SLA from a data store.

Instructions 940, upon execution, cause the processing resource 910 to train a machine-learning prediction model. In one embodiment, instructions 940 may correspond generally to instructions for performing block 320 of FIG. 3 and/or the SVR training procedure described above with reference to Algorithm #2.

Instructions 950, upon execution, cause the processing resource 910 to monitor application performance. In one embodiment, instructions 950 may correspond generally to instructions for performing block 330 of FIG. 3.

Instructions 960, upon execution, cause the processing resource 910 to predict a future serverless workload for the application at a future time. In one embodiment, instructions 960 may correspond generally to instructions for performing block 340 of FIG. 3 and/or the workload prediction described above with reference to Algorithm #1.

Instructions 970, upon execution, cause the processing resource 910 to use a feedback control system to determine a suggested number of replicas. In one embodiment, instructions 970 may correspond generally to instructions for performing block 350 of FIG. 3.

Instructions 980, upon execution, cause the processing resource 910 to cause a serverless framework to scale a number of replicas supporting the application. In one embodiment, instructions 980 may correspond generally to instructions for performing block 360 of FIG. 3.

Figure 10:
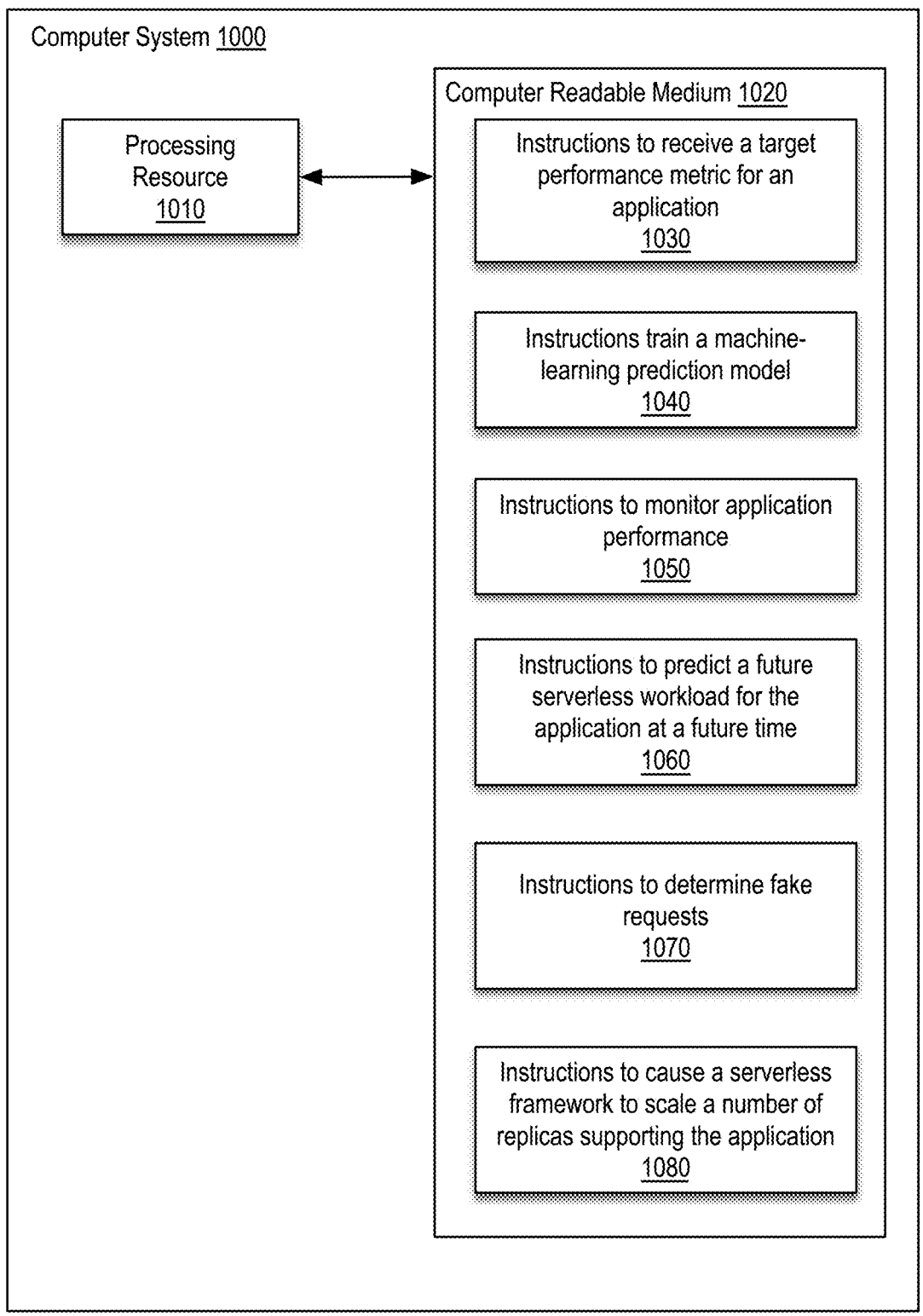
FIG. 10 is a block diagram of a computer system in accordance with an alternative embodiment.

FIG. 10 is a block diagram of a computer system in accordance with an alternative embodiment. In the example illustrated by FIG. 10, computer system 1000 includes a processing resource 1010 coupled to a non-transitory, machine readable medium 1020 encoded with instructions to perform a proactive auto-scaling method in accordance with a public cloud embodiment. As above, the processing resource 1010 may include a microcontroller, a microprocessor, central processing unit core(s), an ASIC, an FPGA, and/or other hardware device suitable for retrieval and/or execution of instructions from the machine readable medium 1020 to perform the functions related to various examples described herein. Additionally or alternatively, the processing resource 1010 may include electronic circuitry for performing the functionality of the instructions described herein.

The machine readable medium 1020 may be any medium suitable for storing executable instructions. Non-limiting examples of machine readable medium 1020 include RAM, ROM, EEPROM, flash memory, a hard disk drive, an optical disc, or the like. The machine readable medium 1020 may be disposed within the computer system 1000, as shown in FIG. 10, in which case the executable instructions may be deemed "installed" or "embedded" on the computer system 1000. Alternatively, the machine readable medium 1020 may be a portable (e.g., external) storage medium, and may be part of an "installation package." The instructions stored on the machine readable medium 1020 may be useful for implementing at least part of the methods described herein.

In the context of the present example, the machine readable medium 1020 is encoded with a set of executable instructions 1030-1080. It should be understood that part or all of the executable instructions and/or electronic circuits included within one block may, in alternate implementations, be included in a different block shown in the figures or in a different block not shown. For example, in one embodiment, the set of executable instructions 930-980 of FIG. 9 and the set of executable instructions 1030-1080 may be installed on the same computer system.

Instructions 1030, upon execution, cause the processing resource 1010 to receive a target performance metric for an application. In one embodiment, instructions 1030 may correspond generally to instructions for performing block 410 of FIG. 4. For example, instructions 1030 may cause processing resource 1010 to prompt an end user for the target performance metric via a user interface of computer system 1000 or retrieve a QoS metric or a particular performance metric specified by an SLA from a data store.

Instructions 1040, upon execution, cause the processing resource 1010 to train a machine-learning model. In one embodiment, instructions 1040 may correspond generally to instructions for performing block 420 of FIG. 4 and/or the SVR training procedure described above with reference to Algorithm #2.

Instructions 1050, upon execution, cause the processing resource 1010 to monitor application performance. In one embodiment, instructions 1050 may correspond generally to instructions for performing block 430 of FIG. 4.

Instructions 1060, upon execution, cause the processing resource 1010 to predict a future serverless workload for the application at a future time. In one embodiment, instructions 1050 may correspond generally to instructions for performing block 440 of FIG. 4 and/or the workload prediction described above with reference to Algorithm #1.

Instructions 1070, upon execution, cause the processing resource 1010 to determine fake requests. In one embodiment, instructions 1070 may correspond generally to instructions for performing block 450 of FIG. 4.

Instructions 1080, upon execution, cause the processing resource 1010 to cause a serverless framework to scale a number of replica supporting the application. In one embodiment, instructions 1080 may correspond generally to instructions for performing block 460 of FIG. 4.

Those skilled in the art will appreciate although various of the examples are described in the context of containers, the techniques can be applied to other types of replicas (e.g., pods, nodes, and the like).

In the foregoing description, numerous details are set forth to provide an understanding of the subject matter disclosed herein. However, implementation may be practiced without some or all of these details. Other implementations may include modifications and variations from the details discussed above. It is intended that the following claims cover such modifications and variations.

What is claimed is:

1. A computer-implemented method comprising:
receiving information indicative of a target value for a performance metric for an application running in a serverless framework of a private cloud;
training a machine-learning prediction model to forecast future serverless workloads during a window of time for the application based on historical serverless workload information associated with the application by performing a training process; and
during the window of time, obtaining a plurality of serverless workload observations for the application from the serverless framework;
predicting a future serverless workload for the application at a future time by applying the machine learning prediction model to the plurality of workload observations;
using a feedback control system that continuously monitors the performance metric to output a suggested number of replicas based on a current value of the performance metric obtained from the serverless framework, the target value, and the predicted future serverless workload, wherein the feedback control system comprises a proportional-integral-derivative (PID) controller; and
prior to the future time, proactively accommodating the predicted future serverless workload by causing the serverless framework to scale a number of replicas supporting the application to the suggested number and pre-warm the replicas.

2. The computer-implemented method of claim 1, further comprising tuning a plurality of parameters of the PID controller using the Ziegler-Nichols method based on a previous number of replicas supporting the application, the target value, and a reference value representing a value below which a given percentage of observations of the target value fails.

3. The computer-implemented method of claim 1, wherein the target performance metric comprises a quality of service (QoS) performance requirement.

4. The computer-implemented method of claim 1, wherein the target performance metric comprises a service level agreement (SLA) metric.

5. The computer-implemented method of claim 1, wherein the serverless workload is represented by a number of requests per second.

6. The computer-implemented method of claim 1, wherein the replicas comprise containers.

7. The computer-implemented method of claim 1, wherein the machine-learning prediction model comprises a support vector regression (SVR) model.

8. The computer-implemented method of claim 7, wherein said training the machine-learning prediction model to forecast future serverless workloads involves the use of a linear kernel, a polynomial kernel, a radial basis function (RBF) kernel or a sigmoid kernel.

9. The computer-implemented method of claim 7, wherein the window of time is dynamic, wherein W represents a number of time units in the dynamic window of time, wherein t represents a current time, the method further comprising:
when a workload variability measure involving a maximum observed workload value and a minimum observed workload value of a plurality of serverless workload observations for the application collected during the dynamic window of time is greater than or equal to a first threshold, then decreasing W; and
when the workload variability measure is less than or equal to a second threshold, then increasing W; and
responsive to expiration of the dynamic window of time, retraining the machine-learning prediction model for a new window of time beginning at t−W and ending at t based on the plurality of serverless workload observations for the application collected during the new window of time by performing the training procedure.

10. A non-transitory machine readable medium storing instructions executable by a processing resource of a computer system, the non-transitory machine readable medium comprising instructions to:
receive information indicative of a target value for a performance metric for an application running in a serverless framework of a private cloud;
train a machine-learning prediction model to forecast future serverless workloads during a window of time for the application based on historical serverless workload information associated with the application by performing a training process; and during the window of time, obtain a plurality of serverless workload observations for the application from the serverless framework;
predict a future serverless workload for the application at a future time by applying the machine learning prediction model to the plurality of workload observations;
use a feedback control system that continuously monitors the performance metric to output a suggested number of replicas based on a current value of the performance metric obtained from the serverless framework, the target value, and the predicted future serverless workload, wherein the feedback control system comprises a proportional-integral-derivative (PID) controller; and
prior to the future time, proactively accommodate the predicted future serverless workload by causing the serverless framework to scale a number of replicas supporting the application to the suggested number and pre-warm the replicas.

11. The non-transitory machine readable medium of claim 10, wherein the instructions are further to tune a plurality of parameters of the PID controller using the Ziegler-Nichols method based on a previous number of replicas supporting the application, the target value, and a reference value representing a value below which a given percentage of observations of the target value fails.

12. The non-transitory machine readable medium of claim 10, wherein the target performance metric comprises a quality of service (QoS) performance requirement.

13. The non-transitory machine readable medium of claim 10, wherein the target performance metric comprises a service level agreement (SLA) metric.

14. The non-transitory machine readable medium of claim 10, wherein the serverless workload is represented by a number of requests per second.

15. The non-transitory machine readable medium of claim 10, wherein the replicas comprise containers.

16. The non-transitory machine readable medium of claim 10, wherein the machine-learning prediction model comprises a support vector regression (SVR) model.

17. The non-transitory machine readable medium of claim 16, wherein the instructions to train the machine-learning prediction model to forecast future serverless workloads use a linear kernel, a polynomial kernel, a radial basis function (RBF) kernel or a sigmoid kernel.

18. The non-transitory machine readable medium of claim 16, wherein the window of time is dynamic, wherein W represents a number of time units in the dynamic window of time, wherein t represents a current time and wherein the instructions are further to:
decrease W when a workload variability measure involving a maximum observed workload value and a minimum observed workload value of a plurality of serverless workload observations for the application collected during the dynamic window of time is greater than or equal to a first threshold; and
increase W when the workload variability measure is less than or equal to a second threshold; and
responsive to expiration of the dynamic window of time, retrain the machine-learning prediction model for a new window of time beginning at t−W and ending at t based on the plurality of serverless workload observations for the application collected during the new window of time by performing the training procedure.

* * * * *